US012698800B2

(12) United States Patent
Moyes

(10) Patent No.: US 12,698,800 B2
(45) Date of Patent: Aug. 4, 2026

(54) SWIVEL

(71) Applicant: Rotojar Innovations Limited, Dyce (GB)

(72) Inventor: Peter Barnes Moyes, Aberdeenshire (GB)

(73) Assignee: Rotojar Innovations Limited, Aberdeen (GB)

( * ) Notice: Subject to any disclaimer, the term of this patent is extended or adjusted under 35 U.S.C. 154(b) by 637 days.

(21) Appl. No.: 17/999,939

(22) PCT Filed: May 25, 2021

(86) PCT No.: PCT/EP2021/063915
§ 371 (c)(1),
(2) Date: Nov. 28, 2022

(87) PCT Pub. No.: WO2021/239736
PCT Pub. Date: Dec. 2, 2021

(65) Prior Publication Data
US 2023/0332641 A1 Oct. 19, 2023

(30) Foreign Application Priority Data

May 28, 2020 (GB) ..................................... 2008041

(51) Int. Cl.
*F16C 23/04* (2006.01)
*E21B 17/05* (2006.01)
(Continued)

(52) U.S. Cl.
CPC .............. *F16C 23/04* (2013.01); *E21B 17/05* (2013.01); *F16C 23/08* (2013.01); *F16C 27/04* (2013.01); *Y10T 403/32213* (2015.01)

(58) Field of Classification Search
CPC .......... E21B 17/02; E21B 17/05; E21B 21/02; F16B 7/0413; F16C 1/265; F16C 17/08;
(Continued)

(56) References Cited

U.S. PATENT DOCUMENTS 3,318,575 A * 5/1967 Harold .................... F16G 15/08
267/141
3,981,368 A * 9/1976 Lundstrom ............. E21B 21/02
175/173
(Continued)

FOREIGN PATENT DOCUMENTS

DE 102013225330 A1 * 6/2015 ............ F16C 19/527
FR 2035182 A5 * 12/1970 .............. F16C 17/26
FR 2466678 A2 4/1981

OTHER PUBLICATIONS

International Preliminary Report on Patentability dated Dec. 8, 2022 for corresponding International Application No. PCT/EP2021/063915.
(Continued)

*Primary Examiner* — Josh Skroupa
(74) *Attorney, Agent, or Firm* — Harness, Dickey & Pierce, P.L.C.

(57) ABSTRACT

A swivel comprising a first swivel member comprising a first load shoulder and a second swivel member comprising a second load shoulder. The first and second swivel members are rotatable relative to each other. A deformable bearing component is provided within a cavity defined between the first and second load shoulder. The deformable bearing component facilitates load transmission between the first and second load shoulders and is deformable to accommodate variations in alignment between the first and second load shoulders.

15 Claims, 5 Drawing Sheets

(51) Int. Cl.
*F16C 23/08* (2006.01)
*F16C 27/04* (2006.01)

(58) Field of Classification Search
CPC .......... F16C 17/26; F16C 19/12; F16C 23/08;
F16C 27/04; F16C 2352/00; F16D 3/24;
F16G 15/08; Y10T 403/32; Y10T
403/32065; Y10T 403/32213
USPC ....... 403/52, 60, 78; 464/18, 19, 20, 21, 162
See application file for complete search history.

(56) References Cited

U.S. PATENT DOCUMENTS

| | | | | | |
|---|---|---|---|---|---|
| 4,478,438 | A | * | 10/1984 | Elorriaga, Jr. ...... | F16L 27/0812 |
| | | | | | 285/94 |
| 5,484,220 | A | * | 1/1996 | Lewis ..................... | F16G 15/08 |
| | | | | | 403/78 |
| 6,923,254 | B2 | * | 8/2005 | Morrow .................. | E21B 17/05 |
| | | | | | 166/88.4 |
| 7,217,056 | B2 | * | 5/2007 | Cooper ................... | E21B 17/02 |
| | | | | | 403/35 |
| 7,828,064 | B2 | * | 11/2010 | Robichaux .............. | E21B 33/06 |
| | | | | | 166/381 |
| 10,472,902 | B2 | * | 11/2019 | Elbadawy ............... | E21B 17/05 |
| 12,152,465 | B2 | * | 11/2024 | Moyes .................... | F16C 23/04 |
| 2004/0035572 | A1 | | 2/2004 | Cooper | |

OTHER PUBLICATIONS

International Search Report and Written Opinion thereof dated Sep.
1, 2021 for corresponding International Application No. PCT/
EP2021/063915.

* cited by examiner

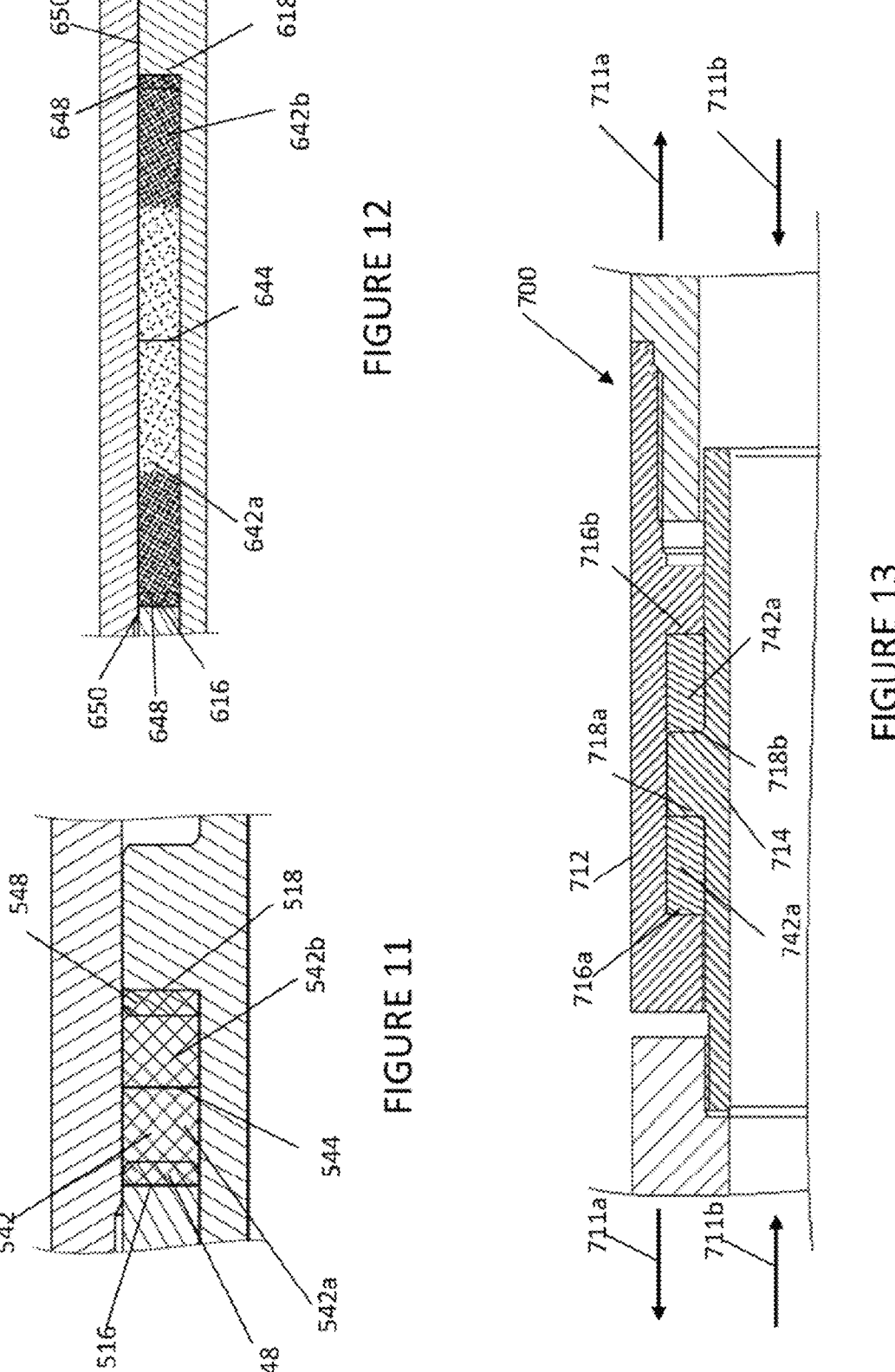

SWIVEL

FIELD

The present disclosure relates to a swivel.

BACKGROUND

Swivels, (also referred to as swivel joints, or swivel subs) are used to permit rotation between parts across a wide range of industries. For example, swivels may be used in wellbore operations, such as in drilling, installation and removal of tools and wellbore infrastructure and the like. Swivels may be used across a range of other industrial applications, such as lifting applications, mooring applications and the like.

Mechanical swivels are known which include opposing bearing surfaces in rotary sliding contact. In some cases a mechanical bearing, such as a roller bearing, may be interposed between rotating components of a swivel. An issue with known swivels may arise when the swivel is subjected to non-uniform loading, for example as a consequence of misalignment between rotating components when under bending loads. This can lead to premature bearing failure, binding of the swivel joint and the like.

SUMMARY

An aspect of the present disclosure relates to a swivel. The swivel comprises a first swivel member comprising a first load shoulder and a second swivel member comprising a second load shoulder. The first and second swivel members may be rotatable relative to each other. A deformable bearing component may be provided within a cavity defined between the first and second load shoulders. Load applied between the first and second load shoulders may be transmitted via the deformable bearing component. The deformable bearing component may be deformable to accommodate variations in alignment between the first and second load shoulders.

The first and second load shoulders may define a primary relative alignment, wherein the first and second load shoulders are positioned in this primary relative alignment when the swivel is not under load. The first and second load shoulders may be aligned in any suitable orientation when in their primary relative alignment. For example, the first and second load shoulders may be aligned such that the shoulders are parallel, or the first and second load shoulders may be aligned such that they are arranged at an incline to one another. The first and/or second load shoulders may be comprise planar or non-planar faces. In some examples, the first and/or second load shoulders may define a profiled shape, such as a curved shape, domed shape, and/or the like. The first and/or second load shoulders may comprise one or more surface features, such as projections, depressions, ribs, dimples and/or the like. The primary relative alignment may be substantially retained when the swivel is under certain load conditions. For example, the primary relative alignment may be substantially retained when the load across the swivel is applied principally in an axial direction. However, non-axial loading, such as from lateral loading, bending and the like, may cause the first and second load shoulders to deviate from the primary relative alignment.

As set out above, the deformable bearing component is deformable to accommodate variations in the alignment between the first and second load shoulders. In this respect, when the first and second load shoulders deviate from their primary relative alignment the deformable component may suitably deform to accommodate the deviation. This may permit more uniform load transmission between the first and second load shoulders to be maintained.

Variations in alignment between the first and second load shoulders may result in the geometry of the cavity defined between the first and second load shoulders varying accordingly. The deformable bearing component may deform to maintain conformance with the geometry of the cavity. For example, if the swivel is subject to a bending load, the cavity geometry may change as the orientation between the first and second load shoulders changes. For example, one lateral side of the cavity may axially reduce while a diametrically opposed side may axially extend, or the cavity may deform into an irregular shape depending on the degree and the location of the applied bending. Deformation of the deformable component may accommodate variations in the geometry of the cavity, and thus permit more uniform load transmission between the first and second load shoulders to be maintained.

The deformable bearing component may be elastically deformable. The deformable component may be resiliently deformable. Such resilience may assist to return the first and second load shoulders to their primary relative alignment condition following removal of the deforming load. The deformable bearing component may be deformable by at least one of bending, compression, expansion, extrusion etc. in order to maintain conformance with the geometry of the cavity.

The deformable bearing component may be configured to deform under any degree of misalignment between the first and second load shoulders. For example, the change in alignment between the first and second load shoulders may be axial, radial or at an inclined angle. The change in alignment, for example, may comprise off-axis misalignment. The off-axis misalignment between the first and second load shoulders may occur while the swivel is rotating.

The deformable bearing component may be deformable to permit an even distribution of an applied axial load between the first and second load shoulders. This may be particularly beneficial when the swivel is subject to bending conditions, improving reliability, wear rates and the like. In this respect, the deformable component may permit a more uniform load distribution between the first and second load shoulders when the swivel is loaded.

The swivel may be required to provide rotation between parts at high axial loads. Therefore, maintaining a more even axial load distribution between the first and second load shoulders may be particularly advantageous by reducing the risk of failure of any bearing component or assembly provided between the first and second load shoulders.

The deformable bearing component may be configured to deform to maintain continuous contact between the deformable bearing component and at least one of the first and second load shoulders. This may facilitate the application of an axial load more evenly between the first and second load shoulders.

The deformable bearing component may accommodate relative rotation between the first and second swivel members. In this regard, the deformable bearing component may function as a bearing. The deformable bearing component may accommodate an applied axial load and frictional forces generated during relative rotation between the first and second swivel members. Relative rotation between the first and second swivel members may be accommodated via sliding contact between the deformable bearing component and one or both of the first and second load shoulders.

A bearing interface may be defined between the deformable bearing component and at least one of the first and second load shoulders. The deformable bearing component may optionally be rotatably fixed to one of the first or second load shoulders, whereby the bearing interface may be between the deformable bearing component and the other of the first or second load shoulders. The provision of a deformable bearing component at the bearing interface may reduce wear rates, friction heating, lubrication issues and the like resulting from use of the swivel.

The swivel may further comprise a mechanical bearing assembly within the cavity. The mechanical bearing assembly may comprise any form of mechanical bearing assembly, for example an assembly comprising opposing bearing faces, or races having one or more rolling bodies in between. At least one of the first and second load shoulders may define one of the faces, or races, of the mechanical bearing assembly. The mechanical bearing assembly may be or comprise a roller bearing assembly, polycrystalline diamond bearing, needle bearing and/or the like.

The provision of a deformable bearing component in combination with the mechanical bearing assembly may provide for the deformable bearing component to reduce the effects of bending on the mechanical bearing assembly, for example accommodating variations in alignment between the first and second load shoulders. This may facilitate a more even axial load distribution across the bearing assembly, reducing wear rates and the likelihood of the bearing seizing up.

The swivel may define a single bearing stage, wherein an applied axial load is borne across the first and second load shoulders provided on the first and second swivel members.

The swivel may comprise multiple bearing stages. For example, the first swivel member may comprise a plurality of axially arranged first load shoulders and the second swivel member may comprise a plurality of axially arranged second load shoulders. A deformable bearing component may be provided within a cavity defined between respective pairs of first and second load shoulders. An axial load applied between the first and second swivel assemblies will be transmitted between respective pairs of first and second load shoulders via the deformable bearing component.

In this way, the axial load capacity of the swivel may be increased by increasing the bearing area by axially arranging bearing stages, rather than increasing the diameter of individual bearing stages, which may not be possible or desirable in some applications.

In some examples, the swivel may define a modular structure, permitting more ready adaptation to meet specific design requirements by allowing the requisite number of bearing stages to be provided without requiring bespoke solutions in each case. For example, stacking or assembling standardised modules as required may permit a desired bearing design to be achieved. For example, the bearing stages may be modular and allow for rotary or non-rotary connections to an adjacent bearing stage. Alternatively, the bearing stages may be integrally formed.

Furthermore, the deformable bearing components may provide for axial load balancing across respective pairs of load shoulders, allowing for a more even distribution of axial load across the swivel. The deformable bearing components may be pre-configured by extrusion to a load balanced configuration. This may be achieved prior to deployment, for example during manufacture of the swivel. The load balanced configuration may also be achieved during initial operation of the swivel, for example by permitting a degree of extrusion from each cavity whilst the swivel in under axial loading for use.

The load balanced configuration may be achieved during continued operation in which equilibrium between the respective pairs of first and second load shoulders is continuously sought. That is, any load imbalance between bearing stages may be readily addressed by disproportionate extrusion of the deformable bearing component within the bearing stage which is subject to relatively higher loading, until the balanced condition is achieved. In this regard, the swivel may be defined as a self-adjusting, or self-balancing multi-stage swivel.

The swivel may further comprise a port in communication with at least one cavity defined between the respective pairs of first and second load shoulders. The port may be provided to allow for extrusion of the deformable bearing component, for example when the swivel is under axial loading to achieve load balancing across respective load shoulders. The port may also allow for extrusion of the deformable bearing component in order to accommodate variations in alignment between the first and second load shoulders. The port may be offset from a bearing interface. This may minimise the likelihood of the bearing interface being deformed by extrusion during the balancing process.

Multiple deformable bearing components may be provided within the cavity or cavities. Multiple deformable bearing components may comprise at least two deformable bearing components. The deformable bearing components may comprise different properties allowing for differing degrees of deformation, for example increased resistance to extrusion, rigidity or the like. The deformable bearing components may comprise the same properties, for example they may comprise the same deformable material.

A bearing interface may be formed between two deformable bearing components. For example, one deformable bearing component may be rotatably fixed to the first load shoulder and one may be rotatably fixed to the second load shoulder. In use, the bearing interface being provided between deformable bearing components may accommodate an applied axial load and frictional forces generated during relative rotation between the first and second swivel members.

The deformable bearing component may be any suitable form. For example, the deformable bearing component may be in the form of monolithic block. For example, the deformable bearing component may comprise a ring of deformable material. The deformable bearing component may be in the form of solid particulars, such as for example, a powder.

The deformable bearing component may comprise any deformable material suitable for use at a bearing interface in a swivel. For example, the deformable bearing component may comprise any suitable extrudable material. The deformable bearing component may also be defined as an extrudable bearing component.

For example, the deformable bearing component may comprise a material having at least one of the following properties: a low co-efficient of friction, a high resistance to extrusion, high heat resistance, high chemical resistance, self-lubrication. The deformable bearing component may comprise at least one of polytetrafluoroethylene (PTFE), ultrahigh-molecular-weight polyethylene (UHMWPE), polyimides, polysulfones, and polyphenylene sulfides. In a particular example, the deformable bearing component may comprise polytetrafluoroethylene (PTFE).

The deformable bearing component may be provided with desired deformation characteristics by any suitable fabrication process, for example extrusion, moulding, additive manufacturing, and/or the like. For example, the deformable bearing component may comprise portions with increased resistance to deformation. The deformable bearing component may comprise a gradient of increased resistance to deformation. For example, this gradient may be provided by increasing relative thickness of the material over axial distance. In some examples, the gradient may be provided through the selection of material properties, for example, the deformable bearing component may comprise a composite material having portions with increased resistance to deformation. The composite material may comprise a filler material provided to gradually increase the component's resistance to deformation.

For example, the composite material may comprise a polymer and filler mix. The filler may comprise carbon fiber, glass, ceramic, metals, metal alloys or any suitable material to impart increased rigidity and/or increased resistance to deformation to the base polymer material. The composite material may comprise a PTFE and carbon fiber mix. The composite material may comprise a PTFE and bronze filler mix. The deformable bearing component may be provided with any required percentage of filler material.

Where a gradient of increased resistance to deformation is required, the composite deformable material may be provided with an axially increasing percentage of filler material. Such a gradient may be provided within a single structure. Alternatively, or additionally, such a gradient may be achieved by the provision of multiple deformable components having a different filler content, and/or different base material properties. For example, multiple machined rings having differing grades of filler may be stacked together.

The composite material may be prepared to provide desired extrusion properties to the material. For example, a second portion of the composite material may comprise a higher density of filler material compared to a first portion, thereby providing the second portion with a greater resistance to deformation than the second portion. For example, the composite material may be provided with a gradient density of filler material to provide a gradient increased resistance to extrusion.

Where a composite material is used, the composite material may be formed by any appropriate fabrication process, such as for example, moulding processes, additive manufacturing and/or the like.

Alternatively, the deformable bearing component may comprise a fluid. The fluid may comprise a liquid or a gel. The fluid may be an incompressible fluid. For example, an oil based lubricant such as, grease. The fluid may comprise a compressible fluid. For example, the fluid may comprise a visco-elastic fluid, such as a gel.

The swivel may comprise end connectors to facilitate coupling with objects, or interface structures to which rotation is to be provided. In some examples, the swivel may comprise threaded connections, quick release connections, eyelet connections, hook connections and/or the like.

The swivel may be configured for use in downhole operations, for example. In this case, the swivel may define an outer diameter which permits suitable downhole deployment and operation. The swivel may be configured for use in drilling operations, tool deployment and retrieval operations, jarring operations and/or the like. The swivel may be used in retrieving infrastructure from wellbores, for example retrieving or pulling casing, liners, completions and/or the like.

The swivel may be configured for use in hoisting applications, for example interposed between hoisting equipment and a payload.

The swivel may be configured for use in tethering applications, such as in mooring applications.

An aspect of the present disclosure relates to a method of operating a swivel. The method may comprise applying an axial load in a first relative direction to a swivel comprising first and second bearing swivel members which are rotatable relative to each other. A deformable bearing component may be provided in a cavity defined between a first load shoulder of the first bearing swivel member and a second load shoulder of the second swivel member. The method may further comprise deforming the deformable bearing component to accommodate variations in alignment between the first and second shoulders.

An aspect of the present disclosure relates to a method of accommodating bending in a swivel, wherein the method comprises deforming a deformable bearing component provided within a cavity defined between first and second load shoulders of first and second swivel members, respectively.

An aspect of the present disclosure relates to a swivel, comprising:

a first swivel member comprising a first load shoulder;

a second swivel member comprising a second load shoulder; and a deformable bearing component provided within a cavity defined between the first and second load shoulders.

Aspects of the present disclosure may also relate to a thrust bearing. The swivels of the previous aspects may also be defined as a thrust bearing. Accordingly, first and second swivel members may also be defined as first and second bearing members or assemblies.

An aspect of the present disclosure relates to a thrust bearing. The thrust bearing may comprise a first bearing assembly comprising a first load shoulder and a second bearing assembly comprising a second load shoulder. The first and second bearing assemblies may be rotatable relative to each other. A deformable bearing component may be provided within a cavity defined between the first and second load shoulders. The deformable bearing component may be deformable to accommodate variations in alignment between the first and second load shoulders.

The deformable bearing component may be deformable to permit an even distribution of an applied axial load between the first and second load shoulders. This may be particularly beneficial when the thrust bearing is subject to bending conditions, improving reliability, wear rates and the like.

The thrust bearing may define a single stage bearing having one pair of first and second load shoulders with a bearing component there between. Alternatively, the thrust bearing may comprise a multi-stage thrust bearing having plurality of axially distributed bearing stages.

It should be recognised that features defined in relation to one aspect may be applied in combination with any other aspect.

BRIEF DESCRIPTION OF FIGURES

These and other aspects of the present disclosure will now be described, by way of example only, with reference to the accompanying drawings, in which:

FIG. 11 shows an alternative deformable bearing component in a swivel according to the present disclosure;

FIG. 12 shows an alternative deformable bearing component in a swivel according to the present disclosure; and FIG. 13 shows alternative arrangement of a swivel according to the present disclosure

DETAILED DESCRIPTION OF THE DRAWINGS

The present disclosure relates to a swivel which may be utilised in any number of applications. In the description that follows example forms of swivels are presented, without any intended restriction on a specific application or use, although some specific examples will be suggested.

Figures 1, 2, 3:
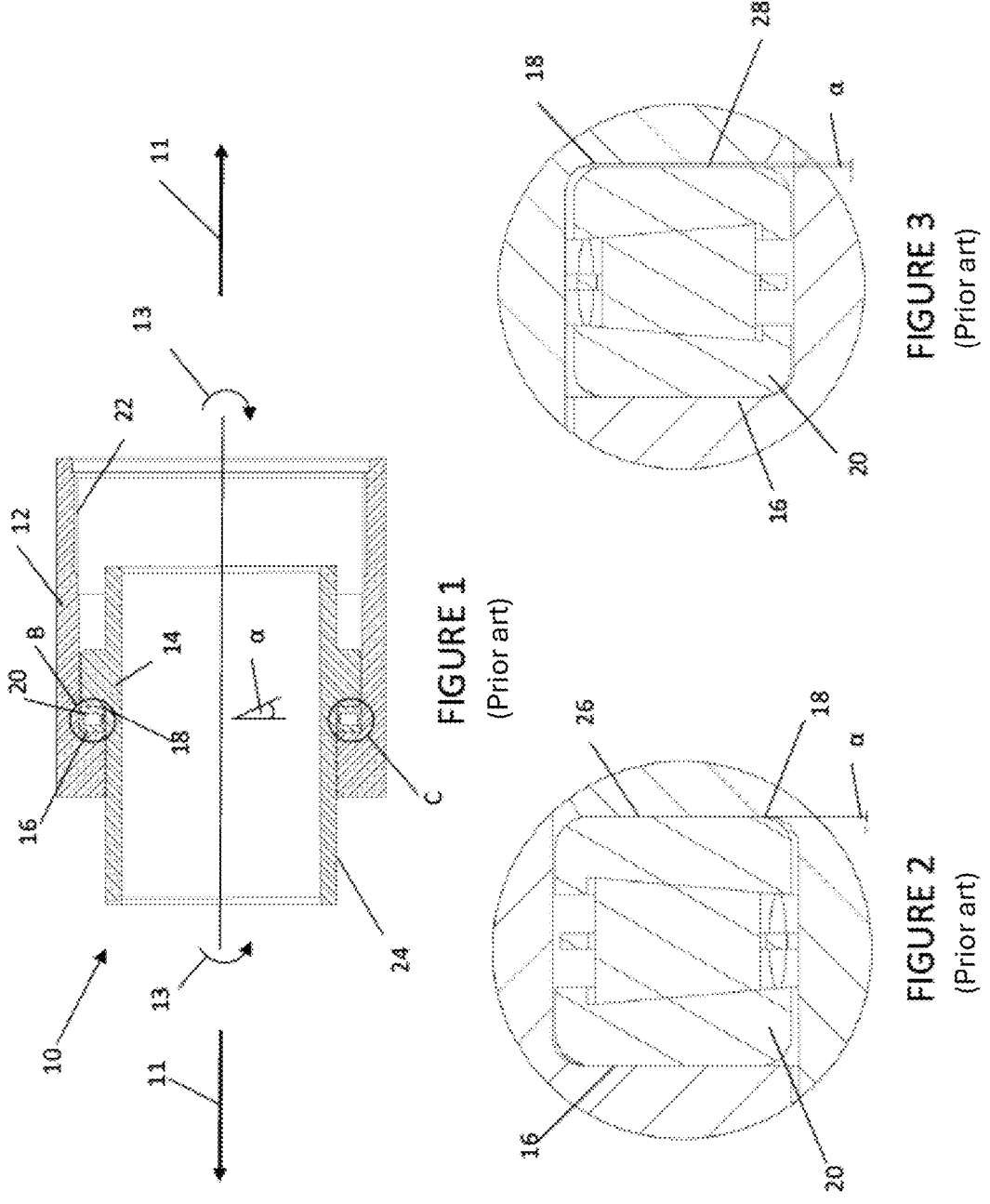
FIG. 1 is a longitudinal cross-sectional view of a typical prior art swivel comprising a mechanical bearing.
FIG. 2 shows an enlarged view of area B in FIG. 1.
FIG. 3 shows an enlarged view of area C in FIG. 1.

FIG. 1 is a longitudinal cross sectional view of a typical prior art swivel joint 10 comprising a mechanical roller bearing 20 to provide relative rotation between a first swivel component 12 and a second swivel component 14. Axial load is transmitted via first load shoulder 16 and second load shoulder 18 provided on the first and second swivel components, respectively. The swivel comprises end-connecting portions 22, 24 for interconnection with objects to which relative rotation is to be provided.

In use, an axial load, illustrated by arrows 11, applied to the swivel 10 will be transmitted between first and second load shoulders 16, 18, via the roller bearing 20, with the roller bearing 20 accommodating relative rotation while under this loaded condition.

Issues in known swivel joints can occur under bending, illustrated by curved arrows 13, which creates a bend angle α between the first and second swivel components 12, 14. Bending across the swivel joint 10 can result in the roller bearing 20 being subject to uneven circumferential load distribution, which could lead to premature bearing failure, binding of the swivel joint 10 and the like. A swivel joint may be exposed to bending conditions in a variety of operational situations, for example caused by slight deviations in the axial positions between the two objects to which the swivel joint is connected, or when the swivel or the objects to which it is connected are subject to bending, lateral loading and the like. As a particular but non-limiting example, bending across a swivel joint might be common in downhole uses, such as in deviated wells.

FIGS. 2 and 3 show enlarged views of areas B and C in FIG. 1. With zero bending load applied the first and second load shoulders 16, 18 are aligned (parallel in this example) in a condition which permits axial load to be evenly distributed through the roller bearing 20 (i.e., full circumferential contact). This alignment may be defined as a primary relative alignment. However, during bending the load shoulders 16, 18 will become misaligned by the bend angle α which results in incomplete circumferential contact between the bearing 20 and the first and second load shoulders 16, 18. For illustrative purposes this misalignment results in a single circumferential load point 26 between the second load shoulder 18 and the roller bearing 20 (FIG. 2), whereas there is no contact (gap 28) between the second load shoulder 18 and the roller bearing 20 at other circumferential positions (FIG. 3). As such, all of the applied axial load 11 will be applied to the roller bearing 20 at point 26. It should be understood that a similar separation gap may be created between the first load shoulder 16 and the roller bearing 20. However, for the purposes of clarity the entirety of the separation gap is illustrated between the roller bearing 20 and the second load shoulder 18.

Figures 4, 5, 6:
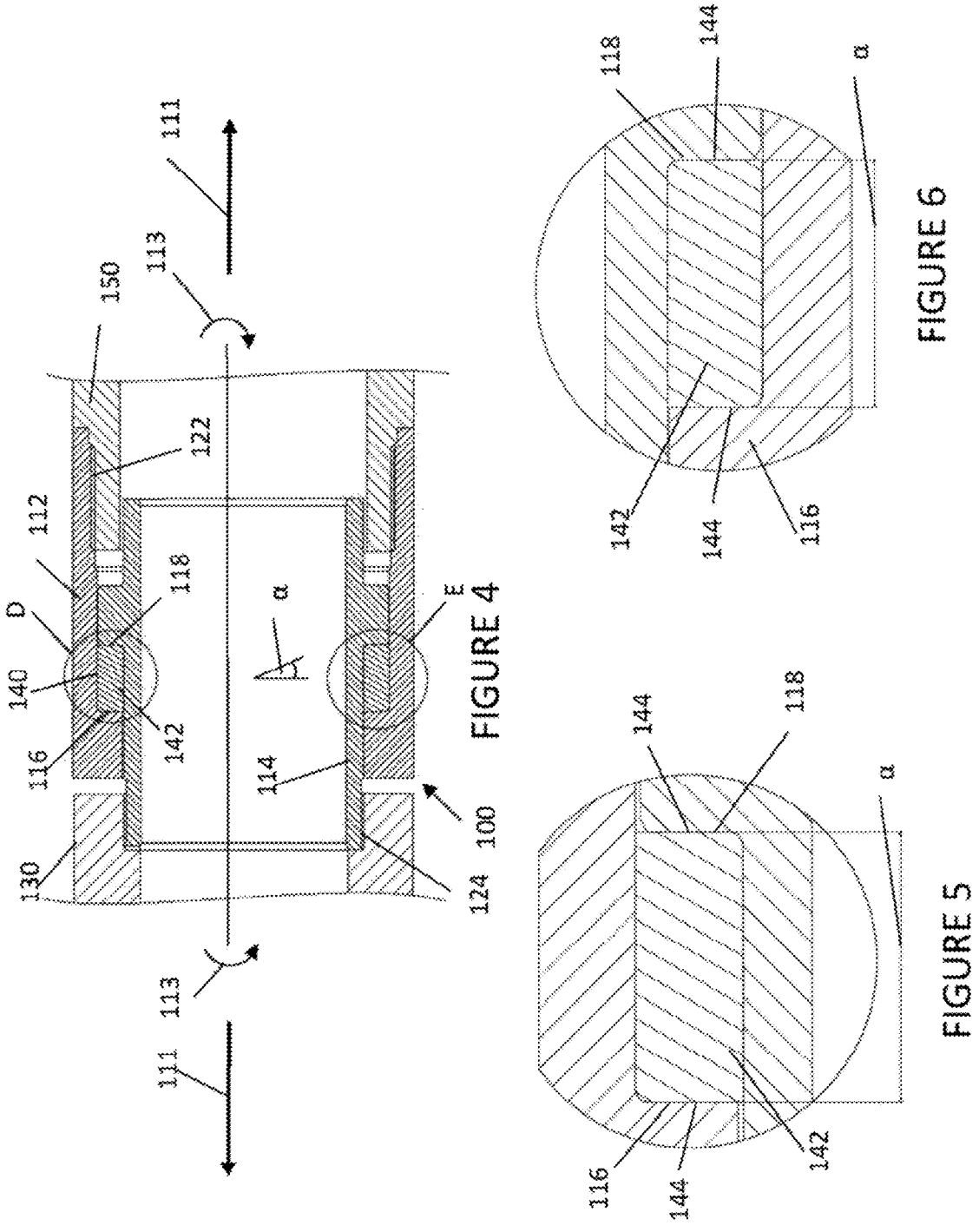
FIG. 4 is a longitudinal cross-sectional view of a swivel comprising a deformable bearing component according to the present disclosure.
FIG. 5 shows an enlarged view of area D in FIG. 4.
FIG. 6 shows an enlarged view of area E in FIG. 4.

FIG. 4 is a longitudinal cross-sectional view of an example swivel 100 according to the present disclosure. Swivel 100 is shown providing a rotary connection between two objects 130, 150 which in the present example are tubular in form, for example as may be deployed in a wellbore environment, although the particular objects being connected or the specific application is in no way limiting. The swivel 100 may equally be connected to other objects, for example, tools, such as downhole tools, winches, lifting apparatus, mooring systems, tether systems and the like.

The swivel 100 comprises a first or outer swivel member 112 and a second or inner swivel member 114, wherein the swivel members 112, 114 are rotatable relative to each other. The first and second swivel members 112, 114 include respective connectors 122, 124 which facilitate connection with objects 130, 150. In the present example the connectors 122, 124 are threaded connectors, although any other connector may be provided.

The first swivel member 112 comprises a first load shoulder 116 and the second swivel member 114 comprises a second load shoulder 118, with the first and second swivel members 112, 114 arranged such that a bearing cavity 140 is defined between the load shoulders 116, 118.

The swivel 100 further comprises a deformable bearing component 142 disposed within the cavity 140 and engaged with the first and second load shoulders 116, 118. In one example, the deformable bearing component 142 may be in sliding contact with both of the load shoulders 116, 118. In another example the bearing component 142 may be rotatably fixed to one of the first and second load shoulders 116, 118, and in sliding engagement with the other of the first and second load shoulders 116, 118.

When the swivel 100 is under axial loading, illustrated by arrows 111, this load will be transmitted between the respective load shoulders 116, 118 via the deformable bearing component 142. Furthermore, relative rotation between the first and second swivel members 112, 114 may be accommodated via sliding contact between the deformable bearing component 142 and one or both of the first and second load shoulders 116, 118.

Depending on the operational loads involved, extrusion of the deformable bearing component 142 under load may be a consideration. In this respect any extrusion gaps may be minimised, for example by close running tolerances between the first and second swivel members 112, 114, incorporation of anti-extrusion features, such as anti-extrusion rings and the like.

When the swivel 100 is subject to bending as illustrated by arrows 113, for example due to the application of a non-axial external load, or arising from misalignment between the objects to which it is connected (tubulars 130, 150 in this example), a bend angle α may arise, such that the geometry of the cavity 140 between the first and second load shoulders 116, 118 is changed. However, by virtue of its deformable and thus compliant nature, the bearing component 142 will maintain conformance to the geometry of the cavity 140, and thus enable continuous and full circumferential contact between the bearing component 142 and the load shoulders 116, 118. This continuous contact is illustrated in FIG. 5 which is an enlarged view of region D of FIG. 4, and FIG. 6 which is an enlarged view of region E of FIG. 4. As such, a continuous bearing interface 144 is maintained between the bearing component 142 and the load shoulders 116, 118, despite the bend angle α. This may thus facilitate the applied axial load 111 to be applied move evenly across the deformable bearing component 142 under bending conditions, improving reliability, wear rates and the like.

The deformable bearing component 142 may comprise any deformable material suitable for use in a bearing. The deformable bearing component 142 may comprise a material having at least one of the following properties: a low co-efficient of friction, a high resistance to extrusion, high heat resistance, high chemical resistance, self-lubricating etc. The deformable bearing component 142 may be or comprise a polymer material, for example polytetrafluoroethylene (PTFE), ultrahigh-molecular-weight polyethylene (UHMWPE), polyimides, polysulfones, polyphenylene sulfides. In the present example, the deformable bearing component 142 is PTFE.

The deformable bearing component 140 can be any suitable form, for example the deformable bearing component could be in the form of monolithic block, for example a PTFE (or other material) ring, solid particulars such as a powder, and/or the like.

Figures 7, 8A, 8B:
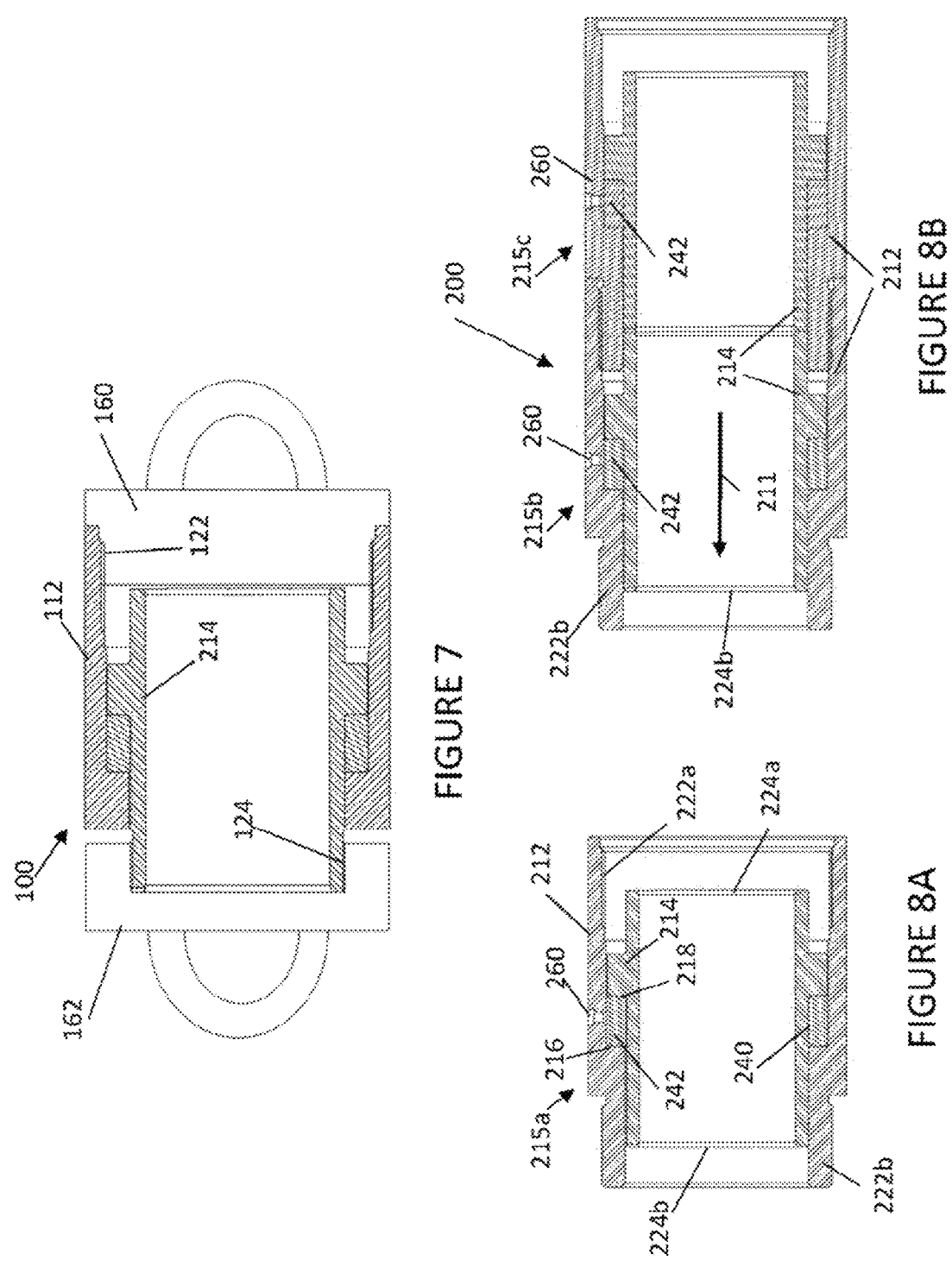
FIG. 7 shows a diagrammatic longitudinal cross-sectional view of the swivel of FIG. 4 in an alternative application.
FIGS. 8A and 8B show an example modular stacked swivel according to the present disclosure.

In the example illustrated in FIG. 4, the swivel 100 is provides a rotary connection between tubular objects 130, 150. However, the swivel 100 may be used in any alternative application and be provided with any desired interface to facilitate interconnection with any type of object. One alternative example deployment of the swivel 100 is illustrated in FIG. 7. In this example, the first swivel member 112 is connected to a first interface structure 160 via threaded connection 122, and the second swivel member 114 is connected to a second interface structure 162 via threaded connection 124. The first and second interface structures 160, 162 in the present example are in the form of eyelet connectors, which may facilitate a hooked or similar connection with objects. The example illustrated in FIG. 7 may be used in numerous applications, such as in hoisting applications, mooring applications and/or the like.

In the example presented above the swivel 100 may be defined as a single bearing stage swivel. However, in some examples an increased load capacity may be achieved by use of multiple bearing stages. An example of a multi bearing stage swivel, generally identified by reference numeral 200, will now be described with reference to FIGS. 8A and 8B.

The swivel 200 comprises a plurality of bearing stages 215a, 215b, 215c, wherein a single bearing stage 215a is shown in FIG. 8A in a disconnected state to illustrate the modular nature of the swivel 200. The individual stages in the present example are largely identical and each comprises a first swivel member 212 having a first load shoulder 216 and a second swivel member 214 having a second load shoulder 218, wherein the first and second swivel members 212, 214 are rotatably moveable relative to each other. A deformable bearing component 242 is provided within a cavity 240 which is defined between the first and second load shoulders 216, 218

The first swivel member 212 is provided with opposing end connectors 222a, 222b (e.g., threaded connectors) which permit the individual first swivel members 212 to be connected together, in end-to-end relation, and create a single first swivel member or assembly. The second swivel member 214 defines opposing axial ends 224a, 224b which are arranged to interface or engage with the end face of an adjacent second swivel member 214, such that when assembled the second swivel members create a single second swivel member or assembly. The interface between adjacent second swivel members 214 may be selected in accordance with the specific deployment and the nature of axial load application. In some cases a simple abutting connection may be provided, such that any rotatable locking between adjacent second swivel members 214 is achieved via friction. Alternatively, a physical rotatable connection, for example via castellations, may be provided. Alternatively further, a rotary and axial connection may be provided, for example via a pinned connection, threaded connection etc., which may permit an axial load in the direction of arrow 211 to be applied to either axial end region of the second swivel assembly.

Providing a rotatable connection (for example via friction and/or a physical connection) between adjacent second swivel members 214 may mitigate against issues resulting from variable thermal expansion between the stages of the swivel 200. For example, should the circumstance arise where one bearing stage is subject to a greater axial load than one or more other bearing stages, for example due to more extensive thermal expansion, the provision of the rotary connection will ensure that the one or more other bearing stages will not simply cease any rotating operation, and will maintain a degree of rotary friction and thus heating, until such time as the overloaded bearing stage might self-adjust, for example by wear, extrusion and/or the like of the deformable bearing component. In this respect, should the other bearing stages be allowed to cool, these bearing stages may exhibit a large drag torque following any self-adjusting phase of an overloaded bearing stage.

Each bearing stage 215a, 215b, 215c is provided with an optional port 260 to allow for extrusion of the deformable bearing component 242 during manufacture and/or during use of the swivel 200. As such, the deformable bearing component 242 may be used to achieve load balancing between the bearing stages 215a, 215b, 215c. This may remove the requirement for exacting tolerances between the component parts of the multiple stages. The deformable bearing components 242 may be pre-configured by extrusion to a load balanced configuration. This may be achieved prior to deployment, for example during manufacture of the swivel 200. In this respect a high axial load may be applied to the assembled swivel 200 until extrusion is identified from each stage via the ports 260, following which the ports 260 may be sealed.

The load balanced configuration may also or alternatively be achieved during initial operation of the swivel 200, without necessarily relying on the ports 260, which may thus be omitted. That is, any initial load imbalance between the bearing stages 215a, 215b, 215c may be such that one or more stages may carry a larger proportion of the total applied load, and thus be subject to a higher degree of extrusion of the bearing component 242, for example via extrusion gaps between the first and second swivel components 212, 214. This may persist until such time as a balanced condition is achieved with each stage carrying an equal proportion of the applied load. This ability to reach a balanced state during operation may be such that the swivel continuously seeks and maintains the balanced configuration. In this regard, the swivel 200 may be defined as self-adjusting, or self-balancing.

Although a modular construction is illustrated in FIGS. 8A and 8B, the first swivel members 212 may be integrally formed. Similarly, the second swivel members 214 may be integrally formed.

Figure 9:
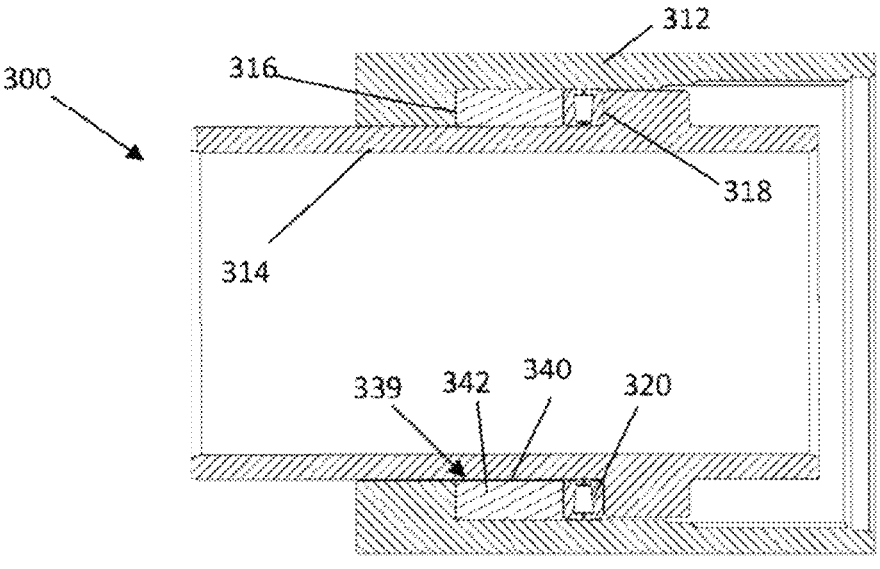
FIG. 9 shows a longitudinal cross-sectional view of an alternative swivel according to the present disclosure.

FIG. 9 provides a cross-sectional view of an alternative swivel, generally identified by reference numeral 300. The swivel 300 comprises first and second relatively rotatable swivel members 312, 314 which comprise respective first and second load shoulders 316, 318 with a cavity 340 defined therebetween. A bearing assembly 339 is provided within the cavity 340, wherein the bearing assembly 339 comprises a mechanical bearing 320 (a roller bearing in this example) and a deformable bearing component 342. When the swivel 300 is subject to bending, the deformable bearing component 342 will deform and act to maintain full contact between the mechanical bearing 320 and the second load shoulder 318. In this example, the deformable bearing component 340 may be optionally rotatably locked to the mechanical bearing 320, for example to a bearing race of the mechanical bearing.

Figure 10:
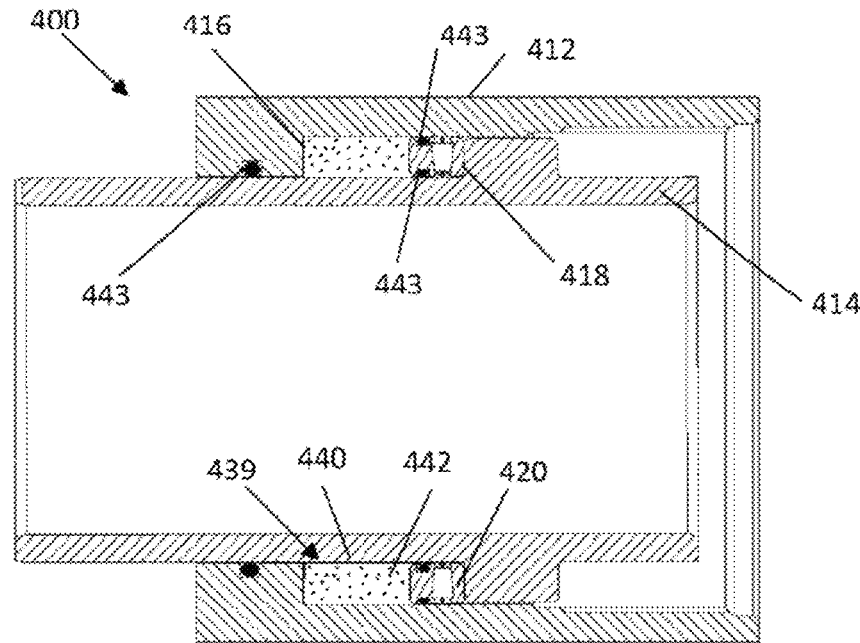
FIG. 10 shows a longitudinal cross-sectional view of an alternative swivel according to the present disclosure.

A further example swivel, generally identified by reference numeral 400 is shown in FIG. 10, wherein the swivel 400 comprises first and second relatively rotatable swivel members 412, 414 which comprise respective first and second load shoulders 416, 418 with a cavity 440 defined therebetween. A bearing assembly 439 is provided within the cavity 440, wherein the bearing assembly 439 comprises a mechanical bearing 420 (a roller bearing in the present example) engaged with the second load shoulder 418, and a volume of fluid 442 between the first load shoulder 416 and the mechanical bearing 420. The volume of fluid 442 is sealed within the cavity 440 via seals 443. The fluid 442, which may be incompressible, functions as a deformable component of the bearing assembly 439, complying to any geometry variations within the cavity caused by bending applied across the swivel 400. Alternatively, the fluid 442 may comprise a compressible fluid. For example, the fluid 442 may comprise a visco-elastic gel.

In the previous examples, the deformable bearing component is shown a single component. FIGS. 11 and 12 illustrate examples where multiple deformable components may be provided within the bearing cavity. In FIG. 11, deformable bearing components 542a, 542b are rotatably connected, via rotary connections 548, to first and second load shoulders 516, 518, respectively. As such, a bearing interface 544 is formed between the deformable bearing components 542a, 542b. The deformable components 542a, 542b by virtue of their deformable and thus compliant nature, will maintain conformance to the geometry of the cavity 540, and thus enable continuous and full circumferential contact between the bearing components 542a, 542b and the load shoulders 516, 518. The deformable components 542a, 542b may comprise different properties, for example increased resistance to extrusion, rigidity or the like. The deformable components 542a, 542b may comprise the same properties, for example they may comprise the same deformable material. Providing the bearing interface 544 between the deformable bearing components 542a, 542b may reduce wear rates, friction heating, lubrication issues when used to accommodate relative rotation in a swivel.

Additionally or alternatively, the deformable bearing component may comprise a composite material manufactured to provide desirable deformable characteristics. For example, shown in FIG. 12, multiple deformable bearing components 642a, 642b are provided within the cavity between first and second load shoulders 616, 618. The deformable bearing components 642a, 642b are rotatably connected, via connections 648, to the first and second load shoulders 616, 618 respectively forming bearing interface 644 between the bearing components. The deformable bearing components may comprise a composite material. For example, the composite material may comprise a polymer and filler mix. The filler may comprise carbon fiber, glass, ceramic or any suitable material to impart increased rigidity and/or increased resistance to deformation to the base polymer material. The composite material may comprise a PTFE and carbon fiber mix. The deformable bearing component may be provided with up to 25% filler material. Where a gradient of increased resistance to deformation is required, the composite extrudable material may be provided with an axially increasing percentage of filler material.

In this example, the darker shaded portions of the deformable bearing components 642a, 642b illustrates a higher density of filler material such that the higher density regions are located axially away from the bearing interface 644. This may allow for reduced friction and wear rates at the bearing interface 644 whilst minimising undesirable extrusion from the cavity through extrusion gaps, for example gaps 650. The material properties of the composite deformable bearing components 642a, 642b will still allow for the bearing components 642a, 642b to deform and maintain full circumferential contact between the bearing components 642a, 642b and the load shoulders 616, 618 if the swivel is subject to bending.

Swivels according to the present disclosure may accommodate applied axial loads in either relative axial direction. In a further example illustrated by swivel 700 in FIG. 13, the swivel 700 is provided with two deformable bearing components 742a, 742b arranged to accommodate an applied axial load in opposing axial directions 711a, 711b. The first swivel member 712 is provided with upper and lower first load shoulders 716a, and the second swivel member 714 is provided with upper and lower second load shoulders 718a, 718b. A deformable bearing component 742a, 742b is provided in cavities defined between upper first and second load shoulders 716a, 718b, and lower first and second load shoulders 716b, 718b. In this example, an applied axial load 711a may be transmitted via upper first and second load shoulders 718a, 716b via bearing component 742a, and an applied axial load 711b will be transmitted via lower first and second load 716b, 718b via bearing component 742b. Under both loading regimes, the deformable bearing components 742a, 742b may deform to accommodate any variations in alignment between the pairs of load shoulders.

It should be understood that the examples provided herein are merely exemplary of the present disclosure and that various modifications may be made thereto without departing from the scope defined by the claims.

The examples disclosed herein are defined as swivels. The swivels may alternatively be defined as thrust bearings, and as such the present disclosure is equally directed to thrust bearings incorporating one or more deformable components to accommodate bending loads. In this respect the thrust bearing may be incorporated into a larger system in which rotation under load is required, such as in jarring operations, drilling operations, milling operations, fishing operations, rotary drive applications (e.g., within top drives) and/or the like.

The invention claimed is:
1. A swivel comprising:
a first swivel member comprising a first load shoulder;

a second swivel member comprising a second load shoulder, wherein the first and second swivel members are rotatable relative to each other, wherein the first and second load shoulders define a primary relative alignment, with the first and second load shoulders being positioned in the primary relative alignment when the swivel is not under load, and wherein the first and second load shoulders are configured to be misaligned from the primary relative alignment in at least one of an axial direction, a radial direction, and at an inclined angle;

a deformable bearing component provided within a cavity defined between the first and second load shoulders, wherein load applied between the first and second load shoulders is transmitted via the deformable bearing component, the deformable bearing component being deformable to accommodate variations in alignment between the first and second load shoulders, wherein the deformable bearing component accommodates relative rotation between the first and second swivel members, and a bearing interface is defined between the deformable bearing component and at least one of the first and second load shoulders.

2. The swivel according to claim 1, wherein the deformable bearing component is configured to deform to maintain continuous contact between the deformable bearing component and at least one of the first and second load shoulders.

3. The swivel according to claim 1, wherein the deformable bearing component is rotatably locked relative to one of the first or second load shoulders.

4. The swivel according to claim 1, wherein the deformable bearing component comprises a polymer material.

5. The swivel according to claim 1, wherein the deformable bearing component comprises polytetrafluoroethylene (PTFE).

6. The swivel according to claim 1, wherein the deformable bearing component comprises a composite material.

7. The swivel according to claim 6, wherein the composite material comprises portions with increased resistance to deformation.

8. The swivel according to claim 1, wherein the deformable bearing component comprises a monolithic block of deformable material.

9. The swivel according to claim 1, comprising a single deformable bearing component with the cavity between the first and second load shoulders.

10. The swivel according to claim 1, comprising a plurality of deformable bearing components within the cavity defined between the first and second load shoulders.

11. The swivel according to claim 1, wherein the swivel defines a single bearing stage.

12. The swivel according to claim 1, wherein the first swivel member comprises a plurality of axially arranged first load shoulders and the second swivel member comprises a plurality of axially arranged second load shoulders; and wherein a deformable bearing component is provided within a cavity defined between respective pairs of first and second load shoulders.

13. The swivel according to claim 12, further comprising a port in communication with at least one cavity defined between the respective pairs of first and second load shoulders, wherein the port is configurable to permit extrusion of the deformable component from the cavity.

14. The swivel according to claim 12, wherein the deformable bearing components are configured to provide for axial load balancing between respective pairs of first and second load shoulders.

15. A method of operating a swivel, the method comprising:

applying an axial load in a first relative direction to a swivel comprising first and second swivel members which are arranged to be rotatable relative to each other;

wherein a deformable bearing component is provided in a cavity defined between a first load shoulder of the first swivel member and a second load shoulder of the second swivel member, wherein the first and second load shoulders define a primary relative alignment with the first and second load shoulders being positioned in the primary relative alignment when the swivel is not under load, and wherein the first and second load shoulders are configured to be misaligned from the primary relative alignment in at least one of an axial direction, a radial direction, and at an inclined angle, and wherein the deformable bearing component accommodates relative rotation between the first and second swivel members, with a bearing interface being defined between the deformable bearing component and at least one of the first and second load shoulders; and deforming the deformable bearing component to accommodate variations in alignment between the first and second load shoulders.

* * * * *